United States Patent
Ayres

(10) Patent No.: US 6,404,271 B2
(45) Date of Patent: Jun. 11, 2002

(54) CHARGE PUMP CIRCUIT

(75) Inventor: John R. A. Ayres, Reigate (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/756,932

(22) Filed: Jan. 9, 2001

(30) Foreign Application Priority Data

Jan. 11, 2000 (GB) ............................................. 0000510

(51) Int. Cl.[7] ................................................. G05F 1/10
(52) U.S. Cl. ........................................................ 327/536
(58) Field of Search ................................. 327/503, 530, 327/534, 535, 536

(56) References Cited

U.S. PATENT DOCUMENTS

| | | | |
|---|---|---|---|
| 5,301,097 A | 4/1994 | Mc Daniel | 363/60 |
| 6,137,344 A | * 10/2000 | Miki | 327/536 |
| 6,160,723 A | * 12/2000 | Liu | 363/60 |

FOREIGN PATENT DOCUMENTS

EP  0813290 A2  12/1997 ............ H02M/3/07

* cited by examiner

Primary Examiner—Jeffrey Zweizig

(57) ABSTRACT

A charge pump circuit (1) comprises a series of voltage boosting stages (11), each stage (11) comprising a switching means (10) and a capacitive element (12) connected in series between the input to the stage and a respective voltage control terminal (14,15). The voltage control terminals (14, 15) comprise at least two groups of terminals receiving respective timed control voltages, and adjacent stages (11) are associated with different terminal groups. The switching means (10) of one or more stages (11) comprises a lateral PIN junction diode. The use of diodes enables the charge pump circuit itself to operate from a lower supply voltage than is possible with the use of TFTs. The use of lateral PIN diodes enables the charge pump circuit to be formed using the same processing as may be required for TFT's of the circuit to which the boosted voltage is supplied. This enables the charge pump circuit to be formed on a common substrate with higher voltage TFT circuitry for, for example, an AMLCD.

15 Claims, 2 Drawing Sheets

CHARGE PUMP CIRCUIT

BACKGROUND OF THE INVENTION

This invention relates to a charge pump circuit having a number of voltage boosting stages. In particular, it relates to a charge pump circuit using diodes as the switches within the boosting stages of the circuit. The invention also relates to electronic devices including such a circuit, particularly but not exclusively, large-area electronic (LAE) devices such as an active matrix liquid crystal display (AMLCD) or another type of active matrix display. A semiconductor device or semiconductor integrated circuit is another device form, in which the charge pump circuit may, for example, be integrated.

Charge pump circuits are known for providing a boosted DC voltage from a lower DC voltage supply. The boosted voltage may be more positive than the high level of the input supply voltage or, alternatively, more negative than the low level of the input supply voltage. Such circuits may comprise a series of voltage boosting stages which each include a switch connected to a capacitor, the switch controlling the flow of charge onto the capacitor. Such a circuit is disclosed in published European patent application EP-A-0 813 290. The switch of each stage is provided at the input of the stage, and the output of each stage is the junction between the switch and capacitor. The input to the circuit is a DC current supply at the lower voltage magnitude. The capacitors are connected alternately to one of two complementary clocked control lines which control the switching operation, which in turn controls the so-called pumping of charge along the series of stages.

During operation of the circuit, one clock cycle causes a charge stored on the capacitors connected to one of the control lines to be passed to the capacitors of the respective next stage. The voltage across the capacitors increases progressively along the series of voltage boosting stages. A larger number of stages leads to a larger output voltage for the circuit. The performance of a charge pump is determined by a number of factors including limitations in the performance of the switch. Two primary limiting factors associated with the switch are the on-state resistance and parasitic capacitance. A higher performance charge pump will be more efficient and thus consume less power. The charge pump circuit of EP-A-0813290 operates in this manner, using transistors as the switching devices. One example of an application of charge pump circuits is in portable electronic devices having display screens. A relatively high voltage is needed for the display, for example 15V, whereas the device is to be powered by a relatively low voltage supply, for example 3 V. The use of a voltage boosting device such as a charge pump circuit is clearly appropriate.

In active matrix liquid crystal displays, there is a trend towards the use of low temperature poly-silicon (LTPS) thin film processes. Such displays typically incorporate thin film transistors (TFT's) as the switches for the active matrix switching array. The control signals needed to drive low-temperature poly-Si TFTs must be at least comparable to and preferably greater than the threshold voltage of the TFT which is typically 3–6V. This makes it difficult to design an efficient charge pump using only LTPS TFTs.

SUMMARY OF THE INVENTION

According to the present invention, there is provided a charge pump circuit comprising a series of voltage boosting stages, each stage comprising a switching means and a capacitive element connected in series between the input to the stage and a respective voltage control terminal, the output from each stage comprising the node between the switching means and the capacitive element, wherein the voltage control terminals comprise at least two groups of terminals receiving respective timed control voltages, wherein adjacent stages are associated with different terminal groups, and wherein the switching means of one or more stages comprises a lateral PIN junction diode.

The use of diodes enables the charge pump circuit itself to operate from a lower supply voltage than is possible with the use of TFTs. The use of lateral PIN diodes enables the charge pump circuit to be formed using the same thin-film processing as may be required for other elements of the circuit or device to which the boosted voltage is supplied. This enables the charge pump circuit to be formed on a common substrate with, for example, higher voltage TFT circuitry. For example, this allows a charge pump circuit of the invention to be integrated with thin-film circuit elements of the low temperature poly-silicon (LTPS) type, in an AMLCD. It also allows the charge pump circuit to be formed with a poly-silicon film on an insulating layer of a bulk semiconductor device, for example in integrated control circuitry of a power MOSFET.

The voltage control terminals preferably comprise two groups of terminals, and the control voltages then comprise a first clocked control voltage for one group and a second complementary clocked control voltage for the other group.

The or each lateral PIN junction diode preferably comprises a gate electrode for allowing an electric field to be applied to the intrinsic region of the diode, to selectively increase the conductivity of the diode. The gate can be capacitively coupled to the intrinsic region via an intermediate dielectric. This increased conductivity gives rise to both a reduction in the on-state resistance (i.e. cathode-anode resistance in forward bias) and a reduction of the turn-on voltage, corresponding to the forward bias voltage drop, of the diode.

Reduction of the on-state resistance of the diode enables a higher output voltage to be achieved with a given number of voltage boosting stages. Reduction of the turn-on voltage enables the construction of a charge pump circuit which may be used with a further reduced supply voltage.

Reduction of the on-state resistance and turn-on voltage of the diode results in an improvement in efficiency and enables a higher output voltage to be achieved with a given number of boosting stages.

If the intrinsic region of the PIN diode is doped weakly n-type then the gate electrode should preferably be biased to a voltage that is at least equal to the voltage at the anode of the diode during forward bias. This will increase the conductivity of the intrinsic region when the diode is forward biased. However, it is also desirable to minimise the effect of the shunt capacitance between the anode and the cathode of the diode. In choosing the optimum node in the circuit to which the gate should be connected, there can be a trade-off between reduced resistance and increased shunt capacitance.

Preferably, if the intrinsic region is weakly n-type and the charge pump is designed to generate a positive boosted voltage, the gate electrode is connected to the output of a voltage boosting stage ahead in the series. This ensures that the electrode voltage is higher than the voltage at the anode of the diode. The charge flowing to the shunt capacitance is then not derived from the input signal to the stage. The electrode is preferably connected to the output of a voltage boosting stage which is associated with the same group of voltage control terminals.

Preferably the PIN junction diode is a polycrystalline silicon (poly-silicon) device, the poly-silicon material being provided at low temperature.

The invention also provides an integrated circuit device or other electronic device which may be formed using, for example, low temperature poly-silicon processing and which includes a charge pump circuit of the invention. The device may comprise an active matrix liquid crystal display device, with the charge pump circuit and a TFT switching array for the display being provided on a common substrate.

BRIEF DESCRIPTION OF THE DRAWING

Embodiments of the invention will now be described by way of example with reference to the accompanying drawing, in which.

DESCRIPTION OF THE PREFERRED EMBODIMENTS

Figure 1:
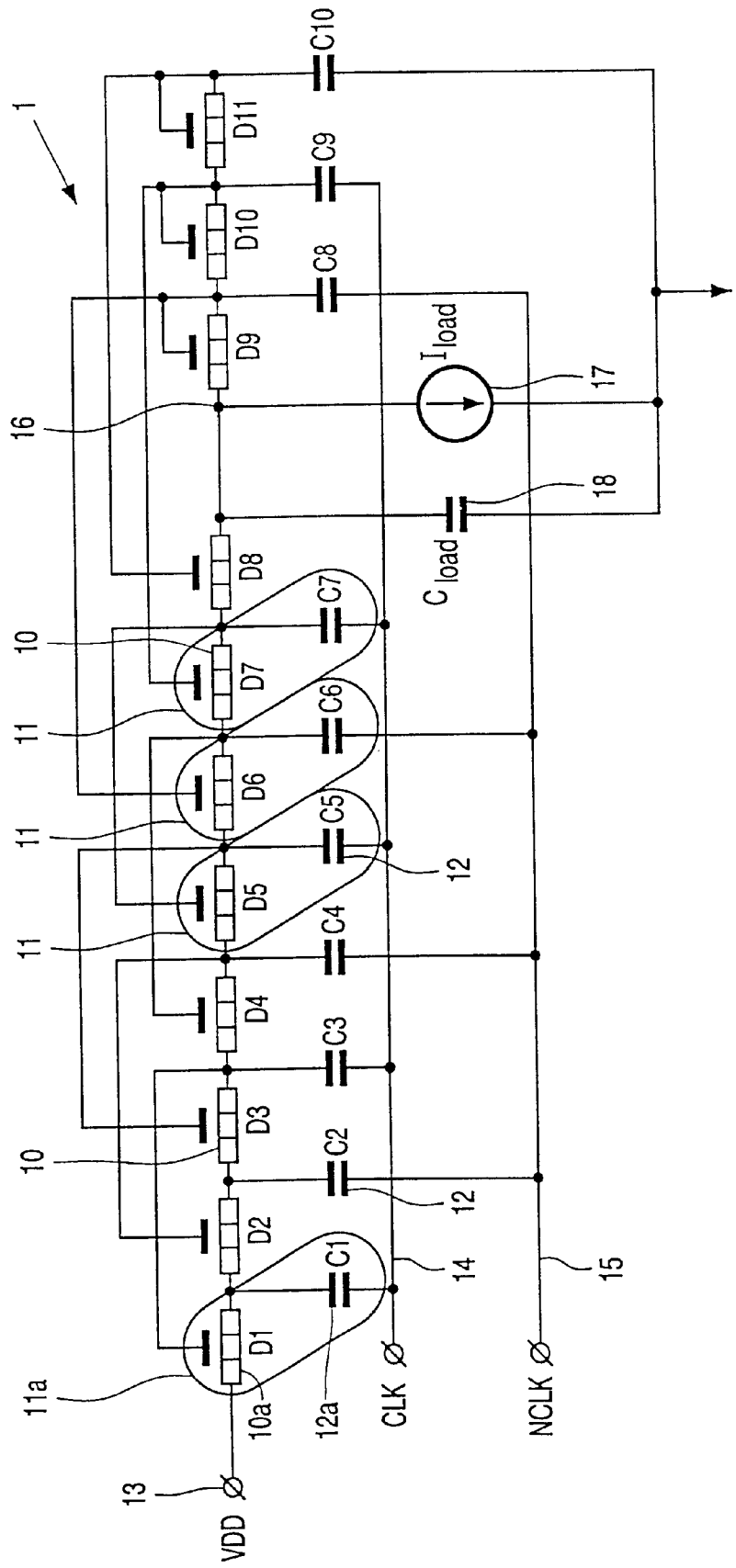
FIG. 1 is a circuit diagram of a charge pump circuit in accordance with the invention.

FIG. 1 shows a charge pump circuit 1 in accordance with the invention. The circuit 1 includes a number of voltage boosting stages 11, each consisting of a switching device 10 and a capacitor 12 connected in series between the input to the stage and a respective voltage control terminal 14 or 15. The output from each stage 11 comprises the node between the switching device 10 and the capacitor 12.

There are two voltage control terminals 14, 15, each associated with a different set of voltage boosting stages 11. Two complementary clocked control voltages are supplied to the control terminals 14,15. Adjacent voltage boosting stages are associated with different control terminals, so that the capacitors 12 of alternate stages are connected alternately to the two control terminals.

The voltages supplied to the control voltage terminals 14 and 15 may simply alternate between a control voltage level and ground. The voltage on one terminal is the complement of the voltage on the other, so that one signal has opposite polarity to the other, but is clocked at the same time.

The output 16 of the circuit 1 is at the end of a series of the voltage boosting stages 11.

In operation, an input voltage acting as a DC current source (supplying a varying current according to demand) is applied to the input 13 of the charge pump circuit 1. When the switch 10a of the first voltage boosting stage 11a is closed, charge flows to the capacitor 12a of the first stage, to charge it to the input voltage (less the voltage drop across the switch). This charge is effectively passed progressively between capacitors in the series of voltage boosting stages 11 to the load capacitor 18, in the following manner.

Charge is provided to the capacitor of a voltage boosting stage when that stage is coupled to the low control voltage (e.g. 0V) and the switch is closed. Charge flows to the capacitor from the output of the previous stage during this time. At the next clock cycle, and after the capacitor has charged, the switch of that stage is opened, and the voltages on the control terminals are reversed. The voltage across the capacitor will then add to the new higher voltage (e.g. 3V) on the control terminal, so that an increased voltage appears at the output of the stage. With the switch in the next stage 11 closed simultaneously, charge will flow, or be pumped, from the capacitor in the one stage to the capacitor in the next. The capacitor in next stage has the lower control voltage applied to it at this time, so that the capacitor of this next stage has a higher voltage across it than the voltage across the capacitor in the previous stage. The capacitor voltage thus increases along the series of stages 11.

The voltage across one capacitor will be greater than the voltage across the previous capacitor by the difference between the control voltages (ignoring the voltage drop across the switches). This is the so-called boost voltage. The operation of the circuit is achieved after an initial settling period which is required for the charges to reach their equilibrium levels. The charges stored rise and fall at around this equilibrium level as charge is pumped along the circuit.

To the extent described above, the operation of the circuit of FIG. 1 is known. The invention is concerned in particular with the switching devices 10 used in the circuit, and according to the invention, lateral PIN diodes D1, D2, D3 . . . are employed which can give rise to reduced resistance but without the increase in shunt capacitance which could be expected.

Figure 2:
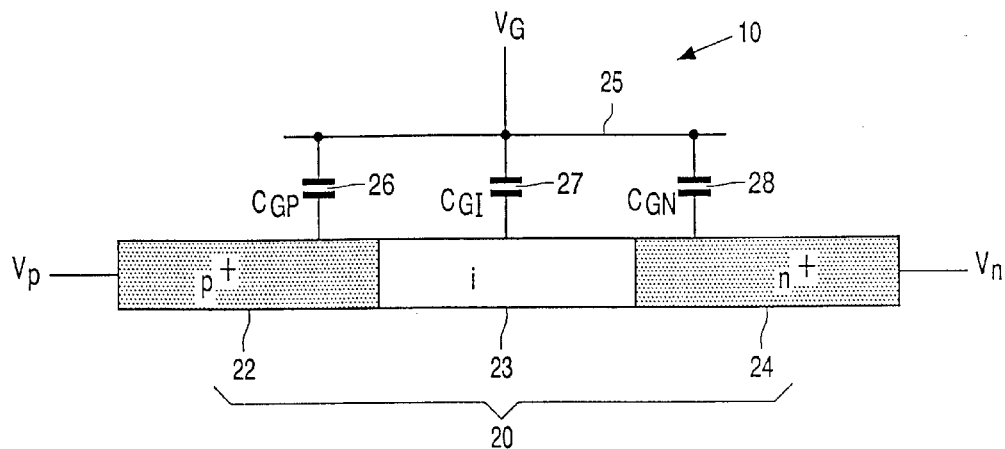
FIG. 2 is a schematic representation of a lateral PIN diode with a gate electrode used in the circuit of FIG. 1.

FIG. 2 shows a lateral, gated PIN diode 10. The diode consists of a p-doped anode 22, an intrinsic region 23 and an n-doped cathode 24. The intrinsic region 23 may be weakly n-type or weakly p-type depending on the type and concentration of dopant which may have been added to the film and also the level any background dopants which may already be present in the film. In this example it is assumed that the intrinsic layer is weakly n-type. The regions 22, 23, 24 are laterally arranged with respect to each other in a layer over a substrate, as opposed being to vertically stacked layers. The diode 10 has an insulated gate electrode 25 which may be used to apply an electric field to the intrinsic region 23. It has been found that the on-state resistance, and also the turn-on voltage, of a lateral PIN diode may be reduced by applying an electric field to the intrinsic region 23. For this purpose a gate electrode 25 is provided as part of the diode 10.

Parasitic capacitances arise between the gate 25 and the other parts of the diode 10, represented by capacitors 26, 27 and 28. These capacitances are referred to as the gate-p region (GP) capacitance 26, gate-intrinsic region (GI) capacitance 27 and the gate-n region (GN) capacitance 28.

The diodes 10 in the stages switch in response to the voltage changes on the voltage control terminals 14,15. When a control voltage for a stage is switched from low to high, the diode of the next stage becomes forward biased so that charge flows from the one stage to the next. When a control voltage for a stage is switched from high to low, the diode of that stage becomes forward biased so that charge flows to the capacitor of that stage from the previous stage. In this way, the charge stored on the capacitor 12 is "pumped" along the series of the stages alternately. By this action, charge accumulates in the load capacitor 18 at a voltage boosted by the series of stages 11.

It is possible to connect the gate electrode 25 to the anode 22 of the same diode 10. The anode 22 and therefore the gate electrode 25 are both at a positive voltage with respect to the cathode 24 during forward bias. The positive bias between the gate electrode 25 and the cathode 24 increases the conductivity of the weakly n-type intrinsic region 23, which tends to improve the performance of the charge pump circuit.

However, connecting the gate 25 to the anode 22 also tends to increase the shunt capacitance between the anode 22 and the cathode 24, because the metallurgical junction of the diode 10 will be close to the anode 22 at the boundary between the anode 22 and the intrinsic region 23. The intrinsic region 23 is directly connected to the cathode 24, as it is weakly n-type. The total shunt capacitance of the diode 10 will be approximately equal to the sum of the GI capacitance 27 and the GN capacitance 28. Increasing the shunt capacitance tends to decrease the performance of such a circuit by reducing the voltage increase per stage.

If the gate 25 is connected to the cathode 24, the shunt capacitance is reduced to the GP capacitance 26, but the sign of the gate voltage then tends to reduce the on-current.

There is, therefore, a trade off between improved conductivity and shunt capacitance of the lateral, gated diode 10 in terms of charge boosting performance.

A preferred connection scheme is illustrated in FIG. 1, in which connections are provided between each gate electrode 25 and the cathode 24 of the diode 10 (i.e. the output of the stage) two stages ahead. This connection ensures that the gate electrode 25 of each respective diode 10 has a positive DC voltage with respect to the cathode 24. Once the charge pump circuit has stabilised under a given load condition this positive voltage will be independent of the two complementary clocked voltages on the control terminals 14 and 15 and equal to the increase in voltage achieved by two stages 11 of the charge pump circuit 1. This serves both to improve the conductivity of the diode when it is in forward bias (assuming the intrinsic layer is doped lightly n-type) and also to minimise the effective shunt capacitance across the diode 10. The shunt capacitance is minimised because there will be no changes in voltage across the capacitors 27 and 28 during operation of the charge pump. The remaining shunt capacitance in this case is just the GP capacitance 26.

The output of the charge pump circuit 1 is a load terminal 16. A load 17 may be connected in parallel with a load capacitor 18, which is essentially the capacitor of the last voltage boosting stage 11 (with D8). Typically, the load capacitor 18 is relatively large to minimise any voltage ripple experienced by the load 17.

The charge pump circuit 1 also has three additional voltage boosting stages 11 (with D9-C8, D10-C9, D11-C10) positioned beyond the load terminal 16. The purpose of these additional stages is to provide suitable voltages for the gates 25 of the three voltage boosting stages 11 positioned immediately before the load terminal 16. These additional stages do not supply any load current to the load terminal 16 so the diodes D9–D11 and capacitors C8–C10 can be relatively small. Also the node to which the gate is connected in these additional stages is less critical. In the figure the gate electrodes are shown as connected to the cathodes, which will minimise shunt capacitance at the expense of on-state resistance. In some circumstances it may be preferable to connect the gate electrodes of the diodes in the additional stages to their respective anodes.

Figure 3:
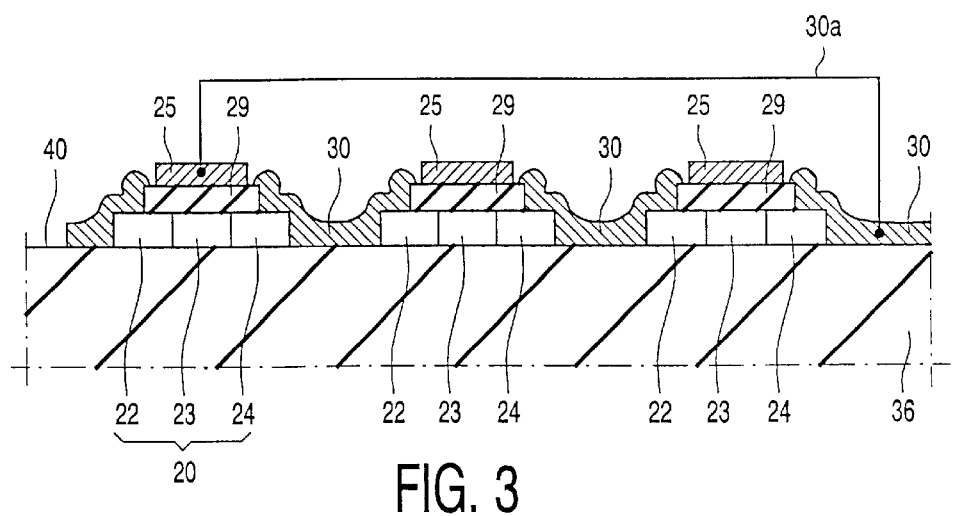
FIG. 3 is a cross-sectional view of one example of the PIN diodes of FIG. 2.

FIG. 3 shows in cross-sectional view a particular example of the thin-film construction and integration of lateral PIN diodes 10 of such a charge pump circuit in an electronic device in accordance with the invention. The device comprises a substrate 36 with thin-film circuit elements on an insulating surface 40 of the substrate. When the present invention is used in a LAE device (such as an AMLCD), the bulk of the substrate 36 may typically be of a low cost, electrically insulating material, for example a glass plate or a polymer film. Typically, an insulating deposited layer of, for example, silicon dioxide may be present on this substrate to provide a good surface 40 for the thin-film circuitry of the device. As illustrated in FIG. 3, at least some of the thin-film circuit elements comprise lateral PIN junction diodes of the charge pump circuit.

The diode regions 22, 23, 24 of p-type, intrinsic, and n-type conductivity may be formed in a polycrystalline silicon film 20 on the surface 40. Known thin-film processing can be used. Thus, the film 20 may be deposited as amorphous or micro-crystalline material with substantially no doping, and at least the film areas for the polysilicon diodes D1, D2, . . . etc. can be crystallized using low temperature processing so as not to disturb other circuit element areas. Typically, this local crystallization may be achieved by exposing these film areas to an ultraviolet laser beam. The highly doped anode and cathode regions 22 and 24 can then be formed locally in the polysilicon film by dopant implantation and/or diffusion. The intermediate region 23 is masked during these doping stages so as to retain its intrinsic conductivity.

These doping stages to form the regions 22 and 24 may be carried out before or after providing the gate 25. However, it can be advantageous first to form the gate 25 and then to use the gate 25 as a part of a mask for localising the dopings, so utilising a self-aligned process. The gate 25 may be a metal film or a doped polysilicon film. As illustrated in FIG. 3, the gate 25 is separated from the diode regions by at least one intermediate dielectric film 29, which provides a capacitive coupling of the gate 25 to the intrinsic region 23. Thus, the gate 25 may be deposited on a dielectric film 29, for example of silicon dioxide, on the polysilicon film 20. The capacitances 26 to 28 occur across this intermediate dielectric 29.

Conductive tracks formed from a metal film 30 can provide the electrode connections of the anode and cathode regions 22 and 24. The film 30 may also provide tracks that form insulated connections to the gates 25. By way of example, FIG. 3 illustrates the preferred connection scheme of a gate 25 to the cathode 24 of a diode that is two stages ahead in the circuit chain. Areas of the metal film 30 may also provide one plate of each of the capacitors 12, which are formed as thin-film capacitors on the substrate 36. Thus, these capacitors 12 may comprise the metal film 30 separated from another conductive film by an intermediate dielectric film.

Although FIG. 3 illustrates a top-gate configuration for the PIN diodes 10, the gate 25 may first be deposited on the substrate surface 40, and then the dielectric film 29, and then the silicon film 20 so as to provide a bottom-gate configuration for the PIN diodes 10. FIG. 3 illustrates PIN diodes 10 with anode and cathode 22 and 24 consisting solely of doped regions of a single film 20. Such anode and cathode regions 22 and 24 result from dopant implantation into these areas of the film 20. However, the cathode and/or anode of the diode 10 may additionally include a respective area of a highly-conductive additional film that is deposited before or after the silicon film 20. These areas of the highly-conductive additional film adjoin the respective region 24 and/or 22 of the film 20 and may form part of the electrode connection to that region. The region 24 or 22 of the film 20 may be formed by dopant diffusion and/or alloying from such a respective highly-conductive additional film. FIG. 3 illustrates a gated diode having a highly-conductive additional film 29 on a gate dielectric film 29. When a charge pump circuit is formed with non-gated PIN diodes (i.e. without the gate film 29), then it is advantageous to lowly dope (or to increase the weak doping of) the intrinsic region 23 so as to reduce its resistance.

A charge pump circuit of the invention may be constructed with low temperature poly silicon (LTPS) diodes, which can be integrated onto the same substrate as a LTPS AMLCD. Lateral, gated PIN diodes are used to provide switching for the circuit as they may be formed in the same process and on a common substrate with TFT's which are required by the LTPS AMLCD. Thus, the TFTs may be formed in separate transistor areas of the film 20 and with insulated gates provided by separate areas of the films 29 and 25. When the device comprises both n-channel and p-channel TFTs, the diode anode regions 22 may be formed simultaneously with the source and drain regions of the p-channel TFTs, and the diode cathode regions 24 may be formed simultaneously with the source and drain regions of the n-channel TFTs.

Figure 4:
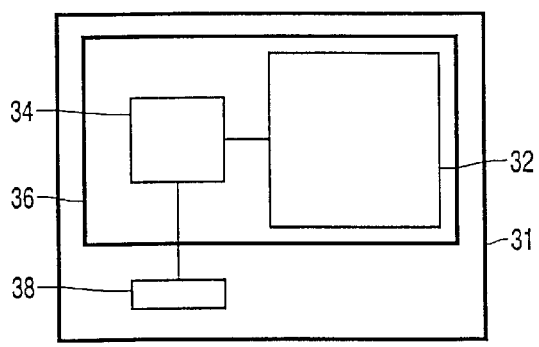
FIG. 4 is a schematic plan view of a LAE device incorporating a display and a charge pump circuit.

FIG. 4 shows an integrated circuit device 31 of this type including an active matrix liquid crystal display device which uses a TFT switching array 32. The switching array and a charge pump circuit 34 are provided on a common substrate 36, and a low voltage power supply 38 (for example a 3V battery) provides power to the integrated circuit 36.

However, the present invention may be used with other types of device, for example in integrated control circuitry of a semiconductor power switch. The power switch may be, for example, a MOSFET. In this type of device, the bulk of the substrate 36 (FIG. 3) may be an active transistor body of, for example, monocrystalline silicon. The insulating surface 40 may be provided by a thick silicon dioxide layer that is thermally grown and/or deposited at the upper surface of the silicon body. The charge pump circuit 1 with its lateral PIN diodes 10 can be constructed in thin film circuitry on this thick silicon dioxide layer. The boosted DC voltage that results from this charge pump circuit in accordance with the invention can be supplied to control circuitry that is integrated in the silicon body and/or on the thick insulating layer. Thus, the integration of the charge pump circuit can be compatible with thin-film technology already used in such devices, for example, for one or more protection diodes or a temperature sensor that are formed in a polysilicon film on the insulating layer at the upper surface of the device body.

As mentioned above, using the same principles, the charge pump circuit may be adapted for use with PIN diodes where the intrinsic layer is doped lightly p-type. In this case the gate electrodes of the diodes will be connected two stages back in the charge pump circuit so that the voltage on the gate is negative with respect to the anode. This will increase the conductivity of the weakly p-type intrinsic layer whilst also minimising the shunt capacitance. The shunt capacitance is minimised because the negative DC voltage between the gate and the anode will be independent of the two complementary clocked control voltages. This means that the effect of the gate-anode capacitance 26 and the gate-intrinsic region capacitance 27 is effectively eliminated. The remaining shunt capacitance is the gate-cathode capacitance 28.

It will be understood that the charge pump circuit may also be adapted to generate a voltage more negative than the lowest level of the input voltage range. In this case the diode connections should be reversed (i.e. NIP rather than PIN) compared with the circuit in FIG. 1. Also the input terminal 13 should be connected to VSS, where VSS is the most negative input supply line. If the intrinsic layer 23 is weakly n-type then the gate electrode 25 should be connected two stages back so that a positive voltage is present with respect cathode 24, which both increases the conductivity in the intrinsic layer 23 and minimises the shunt capacitance to the gate-anode capacitance 26. If the intrinsic layer 23 is weakly p-type then the gate electrode 25 should be connected two stages forward so that a negative voltage is present with respect anode 22, which both increases the conductivity in the intrinsic layer 23 and minimises the shunt capacitance to the gate-cathode capacitance 28.

In the examples given the gate connection was taken either 2 stages forwards or backwards. In fact any multiple of 2 would have the same desirable effect. That is, the gates could be taken 2, 4, 6 etc. forwards or backwards as appropriate.

In the example given the only switching devices in the charge pump circuit are the lateral diodes. In practice it may be desirable to add another switching device in parallel with the lateral diode, such as a thin film transistor. The transistors could then be used to further reduce the forward voltage drop across the diodes. Appropriate biasing of the transistors could be obtained from nodes within the charge pump circuit. In this option the diodes are necessary to start the charge pump and may still pump the majority of the charge during operation.

As used herein, the term "PIN diode" refers to a semiconductor device having an n-type doped region separated by an intrinsic region from a p-type doped region, and is not intended to be specific as to the lateral orientation of these regions over a substrate. The region sequence may be P,I,N or N,I,P.

What is claimed is:

1. A charge pump circuit comprising a series of voltage boosting stages, each stage comprising a switching means and a capacitive element connected in series between the input to the stage and a respective voltage control terminal, the output from each stage comprising the node between the switching means and the capacitive element, wherein the voltage control terminals comprise at least two groups of terminals receiving respective timed control voltages, and wherein adjacent stages are associated with different terminal groups, characterised in that the switching means of one or more stages comprises a lateral PIN junction diode.

2. A charge pump circuit as claimed in claim 1, wherein the voltage control terminals comprise two groups of terminals, and wherein the control voltages comprise a first clocked control voltage for one group and a second complementary clocked control voltage for the other group.

3. A charge pump circuit as claimed in claim 1, wherein the lateral pin junction diode comprises a lateral gate electrode for allowing an electric field to be applied to the intrinsic region of the diode.

4. A charge pump circuit as claimed in claim 3, wherein the intrinsic layer of the PIN diode has n-type doping, and the gate electrode is coupled to a voltage which is at least equal to the voltage at the cathode of the diode during forward bias of the diode.

5. A charge pump circuit as claimed in claim 3, wherein the intrinsic layer of the PIN diode has p-type doping, and the gate electrode is coupled to a voltage which is less than the voltage at the anode of the diode during forward bias of the diode.

6. A charge pump circuit as claimed in claim 4, adapted to generate a positive voltage greater than the highest level of the input voltage range, wherein the gate electrode is connected to the output of a voltage boosting stage ahead in the series.

7. A charge pump circuit as claimed in claim 6, wherein the output of the circuit is provided at the output of an output stage, further stages in the series following the output stage.

8. A charge pump circuit as claimed in claim 4, adapted to generate a negative voltage lower than the lowest level of the input voltage range, wherein the gate electrode is connected to the output of a voltage boosting stage behind in the series.

9. A charge pump circuit as claimed in claim 6 wherein the gate electrode is connected to the output of a voltage boosting stage which is associated with the same group of voltage control terminals.

10. A charge pump circuit as claimed in claim 1, wherein the diode comprises regions of p-type, intrinsic and n-type conductivity laterally arranged in a polycrystalline silicon film.

11. A charge pump circuit as claimed in claim 10, wherein an output load comprises the capacitive element of the output stage.

12. An electronic device including a charge pump circuit as claimed in claim 1, wherein the device comprises a substrate with thin-film circuit elements on an insulating surface of the substrate, at least some of the thin-film circuit elements comprising lateral pin junction diodes of the charge pump circuit.

13. An electronic device as claimed in claim 12, wherein the device comprises an active matrix display having on the same substrate the charge pump circuit and a TFT switching array for the display.

14. A charge pump circuit as claimed in claim 7, wherein the gate electrode is connected to the output of a voltage boosting stage which is associated with the same group of voltage control terminals.

15. A charge pump circuit as claimed in claim 8, wherein the gate electrode is connected to the output of a voltage boosting stage which is associated with the same group of voltage control terminals.

* * * * *